Figure 1A:
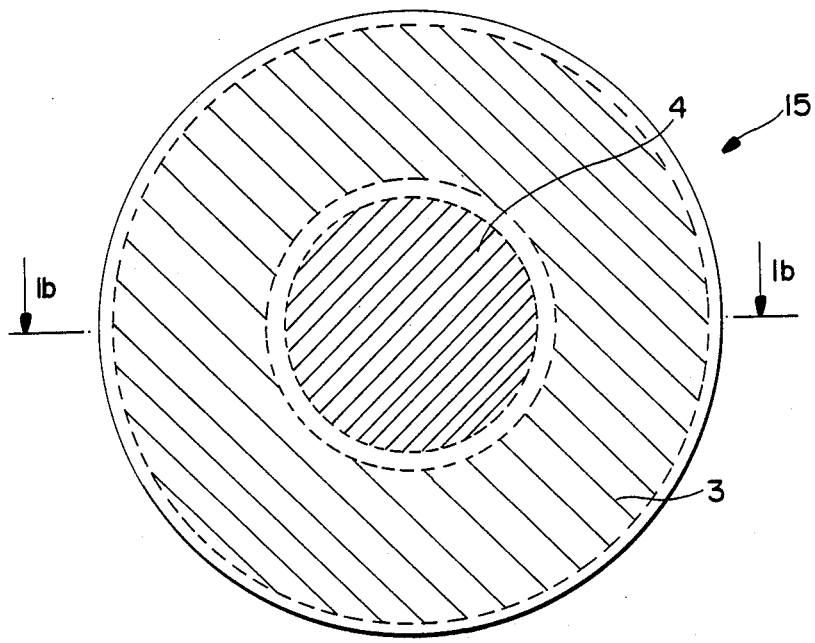

United States Patent [19]

Gröttrup et al.

[11] Patent Number: 4,841,128
[45] Date of Patent: Jun. 20, 1989

[54] CIRCUIT UNIT

[75] Inventors: Helmut Gröttrup; Thomas Maurer, both of Munich, Fed. Rep. of Germany

[73] Assignee: Gesellschaft fur Automation u. Organization mbH, Munich, Fed. Rep. of Germany

[21] Appl. No.: 422,909

[22] PCT Filed: Jan. 8, 1981

[86] PCT No.: PCT/DE81/00008
§ 371 Date: Sep. 8, 1982
§ 102(e) Date: Sep. 8, 1982

[87] PCT Pub. No.: WO82/02444
PCT Pub. Date: Jul. 22, 1982

[51] Int. Cl.[4] .............................. G06K 19/06
[52] U.S. Cl. ...................... 235/491; 235/451; 235/492; 357/30; 365/102; 365/108
[58] Field of Search ............ 235/380, 454, 455, 468, 235/473, 491, 451, 492; 365/108, 110, 102; 357/30; 307/311

[56] References Cited

U.S. PATENT DOCUMENTS

| 3,637,994 | 1/1972 | Ellingboe . |
| 3,869,082 | 3/1975 | Ludin . |
| 3,971,916 | 7/1976 | Moreno . |
| 3,978,320 | 8/1976 | McBride, Jr. . |
| 4,007,355 | 2/1977 | Moreno .............................. 235/492 X |
| 4,245,164 | 1/1981 | Funahashi ........................ 357/30 X |
| 4,277,837 | 7/1981 | Stuckert .............................. 235/380 |
| 4,281,208 | 7/1981 | Kuwano et al. .................. 357/30 X |

FOREIGN PATENT DOCUMENTS 1949777 10/1970 Fed. Rep. of Germany .
2659573 7/1977 Fed. Rep. of Germany .

Primary Examiner—David L. Trafton
Attorney, Agent, or Firm—Sandler & Greenblum

[57] ABSTRACT

A circuit unit is described, comprising an integrated circuit disposed on a substrate as its carrier and coupling elements for energy transfer, data output and, if required, data input.

All coupling elements are disposed on the substrate which bears the integrated circuit. The circuit units may be advantageously embedded in identification cards.

33 Claims, 4 Drawing Sheets

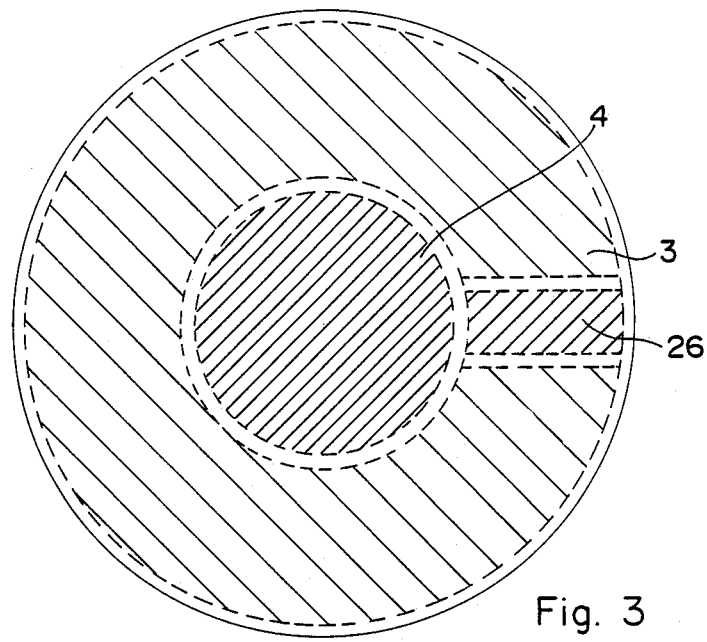
Fig. 3
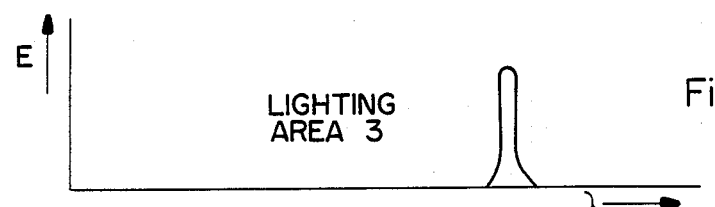
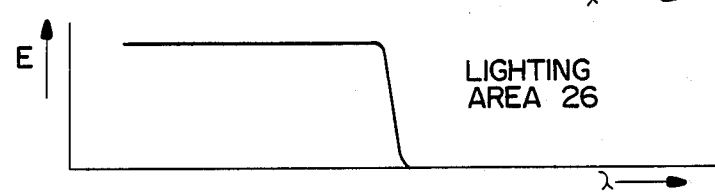
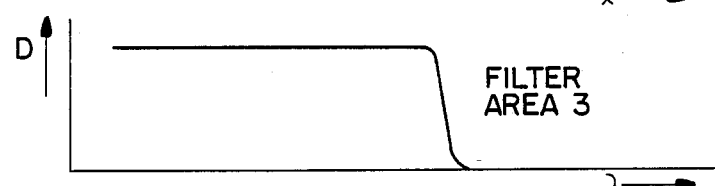
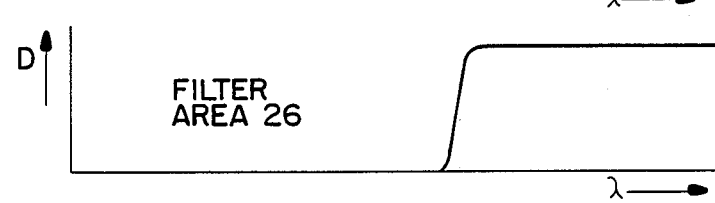

CIRCUIT UNIT

The invention relates to a circuit unit comprising a circuit integrated on a substrate and using for its operation coupling elements for energy transfer, data output and, if required, data input.

Today, the majority of circuit units in the form of integrated circuits are realized on one semi-conductor chip (substrate) each. These semi-conductor chips have at their edges metallized terminals by which they can be connected by appropriate welding or soldering methods by wires with the terminals of the housing enclosing them or directly with the surrounding circuit.

There are applications in which the electrical connection between the semiconductor chip and its surroundings is not desirable. For example, it has been proposed (German Offenlegungsschrift No. 26 59 573) to equip identification cards with semiconductor chips to improve their protection against imitation, store an amount of information in the identification card at the same time and possibly change this information in a controlling device in cooperation with transmitters and receivers.

The incorporation of circuit units in identification cards causes problems because the cards are exposed to mechanical stress during use, which may destroy in particular the electrical connections between the circuit unit and the terminals located on the cards. The incorporation of circuit units in identification cards is also complicated by the terminal leads which are sensitive to mechanical stress.

It has therefore been proposed (German Offenlegungsschrift No. 19 45 777) to arrange the coupling elements in charge of data input and output directly on the semiconductor chip without any leads, disposing them in a so-called "identificant", for example in order to identify persons. The data are transferred via bundles of optical fibers which must be placed on the circuit unit congruently to the coupling elements. The energy is transferred capacitively via corresponding metal surfaces applied to the outside of the identificant. The surfaces are connected by leads to the semiconductor chip, thus causing the same difficulties as mentioned above.

The problem of the invention is thus to propose an integrated circuit for the above-mentioned or similar purposes, the coupling elements of which are designed in such a way that they are insensitive to a large extent to mechanical stress.

The problem is solved according to the invention by arranging all coupling elements on the substrate which bears the integrated circuit.

The substrate thus exhibits not only the integrated circuit but also elements of data transformation and energy supply which are directly connected to the substrate. The circuit unit is thus a compact unit which can be inserted in a simple manner, e.g. into any kind of identification element such as an identification card, coin, ring, etc., and ensures extremely troublefree operation due to the absence of leads. Finally, the compact design offers further possibilities of miniaturizing such circuit units, thus allowing for cases of application which were ruled out for the circuit units known up to now.

There are a number of possibilities for how to realize the coupling elements according to the inventive idea. For example, light converters such as photocells may be provided for energy transfer integrated on the substrate which supply the electricity necessary for the circuit when struck by light. The input as well as the output of the data may also take place optically, so that a liquid crystal read-out if used, for example, for data output, and corresponding photosensitive elements such as photodiodes are used for data input. The data can also be read in or out capacitively. The necessary transmitting and receiving electrodes are vaporized directly onto the substrate in the form of conductive coatings.

Figure 1B:
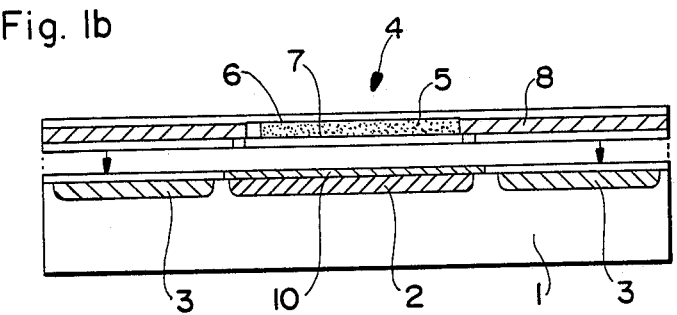
Figure 2A:
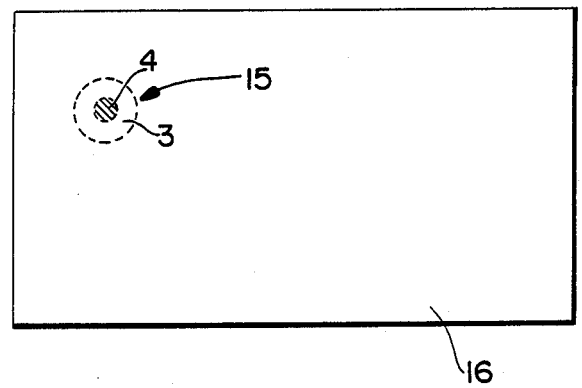
Figure 2B:
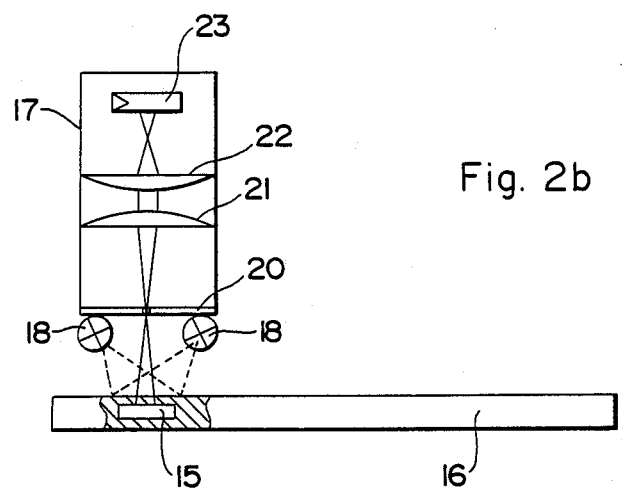
Figure 5:
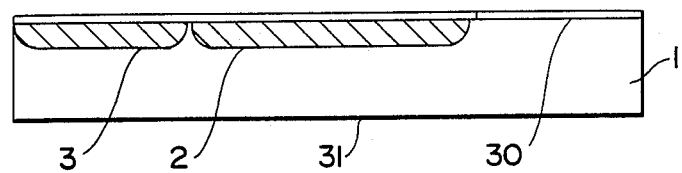
Figure 6:
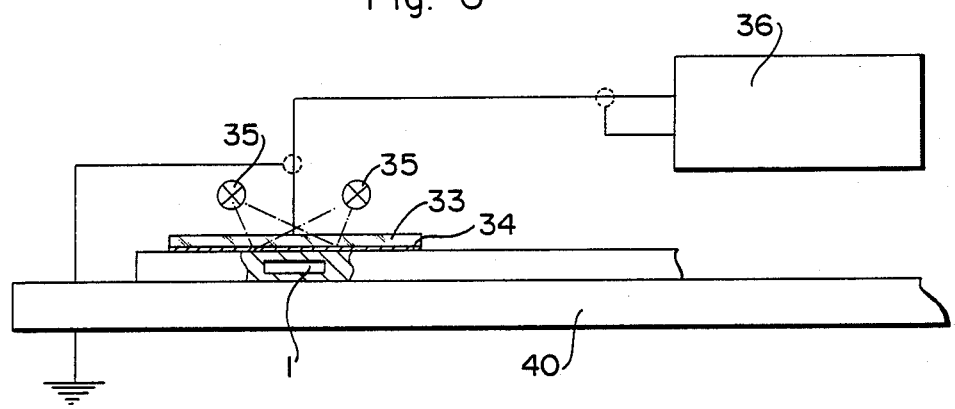

It is crucial for all embodiments that the coupling elements are in direct contact with the substrate without any leads. Further advantages and developments of the invention are the subject-matter of sub-claims. In the following, embodiments of the invention shall be described in more detail with reference to the adjoined drawings. These show:

FIGS. 1a, 1b an optically operated circuit unit from the top and in cross-section, FIG. 2a the circuit unit as in FIG. 1, incorporated in an identification card, FIG. 2b the identification card as in FIG. 2a in a controlling device, FIG. 3 an optically operated circuit unit with the possibility of data input, FIGS. 4a, 4b the optical spectra of the light sources for energy supply and data input for the circuit unit as in FIG. 3, FIGS. 4c, 4d the attenuation characteristics of the filters for masking the data input area and the energy supply area, FIG. 5 a capacitively operated circuit unit and FIG. 6 the circuit unit as in FIG. 5 in a controlling device.

FIGS. 1a and 1b show a circuit unit 15 according to the invention in a schematic and greatly enlarged simple embodiment. This can be a circuit unit, for example, which is supplied with energy by photoelectric transducers and also possesses elements which make it possible to read out certain information during operation. When incorporated in an identification card, the circuit unit can be used, for example, for storing a code word, so that the card may be used as an electronic key for controlling admittance, etc.

As can be seen in FIG. 1b, an integrated circuit 2 produced in the known manner is located on a silicon wafer 1 (substrate). The integrated circuit 2 covers only a small part of wafer 1. In the rest of the surface, photosensitive semiconductors, e.g. photocells 3, are integrated to supply the energy necessary for the operation of the integrated circuit, dependent in the known manner on the radiation power of the incident light. The elements are connected with each other and with the integrated circuit by means of conductive ridges which are vaporized on wafer 1 as is usual is the production of integrated circuits.

The data are read out by so-called "liquid crystal" elements 4, which are often used today as display elements. The liquid crystal element comprises a liquid crystal layer 5 which is enclosed in a frame 8 between two transparent electrodes 6,7. Frame 8 is adapted to the size of silicon wafer 1. As is known, liquid crystal layers have the property of changing their transparency consuming extremely little energy as soon as an electric field is applied to conductive coatings 6,7 on both sides of the layer. Thus the illuminated liquid crystal layer sometimes appears milky to the observer, whereas it is transparent in an excited state and whatever background it has (a darkly colored layer 10 in FIG. 1b) becomes visible. To finish off the circuit unit, the frame 8 bearing the liquid crystal is connected firmly with silicon wafer 1, for example, by means of an appropriate adhesive, and electrodes 6,7 are connected with the corresponding terminals of the integrated circuit 2 by the throughplating method. Frame 8 is transparent in the spectral range relevant for photocells 3, so that masking photocells 3 does not interfere with their functioning. The arrangement of data read-out element 4 and energy supply element 3 is advantageous—especially when liquid crystal elements are used for data read-out—in that when the circuit element is irradiated over a large surface, both the photocells are activated and the liquid crystal read-out is lit up. The operation of the circuit unit is thus possible without any elaborate positioning problems and without much effort (only one lighting unit).

The elements for energy supply and for data read-out, however, do not necessarily have to be arranged only on one side of the silicon wafer.

FIG. 2a shows a circuit unit 15, incorporated in an identification card 16.

As was already mentioned above, the circuit unit in its most simple embodiment is responsible for reading out only one defined piece of information, for example, in the form of an identification number, during one control process. The number is stored in a corresponding, non-transient memory within the circuit unit during its production by the known methods. As shown in FIG. 2b, the identification card is directed during the testing of the identification number under a device 17 comprising, among other things, a light source 18 for illuminating circuit unit 15. Due to this irradiation photocells 3 supply the energy necessary for the operation of the unit. As soon as the circuit is operable, the stored information is read out in the form of light/dark modulations by means of the liquid crystal element 4 shown in FIG. 1b, which is also illuminated by the light source. To evaluate the light/dark modulations the liquid crystal element is reproduced on a photodiode 23 by means of an optical system comprising a diaphragm 20 and two lenses 21,22. The adjustment of the identification card within the controlling device may be carried out by means of appropriate mechanical positioning aids (not shown).

The circuit unit described in FIGS. 1a, 1b is only in a position to read out information which is precisely predetermined, not modifiable and typical for every identification card during the control process. However it may be desirable in a number of cases to feed the circuit unit external data as well, which are processed to output information in the integrated circuit, possibly in combination with the data stored in it, or else to change the storage states in the integrated circuit which affect its future behavior. An embodiment which is also suited for this task consists, for example, in feeding in the data that are externally fed in via the photocells used for supplying the circuit unit with electricity. The circuit unit can have the same external construction as shown in FIGS. 1a, 1b. In this embodiment, the light used for illuminating the photocells is composed of a direct portion and an alternating portion containing the information, so that the photocells irradiated by light modulated in this way supply electrical signals which are modulated accordingly. Inside the integrated circuit, the alternating portion is outputted via known electric filters and is fed to the following electronic circuits in the form of information, possibly after being appropriately amplified. Inside the integrated circuit, the direct portion is fed to the energy supply.

Another possibility of providing the circuit unit with data externally is shown in FIG. 3. The surface of the circuit unit shows in this case an area 26 which is insulated from its surroundings—indicated in the figure by cross-hatching—, in which an additional photodiode is integrated in the silicon substrate. The photodiode converts the light modulated according to the information to be read in, into electrical signals.

In order to attain a simplification in the construction of the integrated circuit, a separation of the light currents for energy supply and data read-in is useful in the last-mentioned embodiment. This can be achieved, for example, by means of optical imaging systems which illuminate areas 3, 26 separately.

A possibility which is easier to realize technically consists in separating the light currents according to their frequency. In the following, only one possibility among many is described for separating light currents according to their frequency. Area 26 is illuminated for data read-in with a spectrum lacking the IR-portion, whereas area 3 for energy supply is illuminated solely with IR light. Supplying the energy area with IR light exploits the property of silicon photocells of being particularly sensitive in this range, so that good performance can be achieved even in the case of photocells with small dimensions. In principle, of course, the area for data read-in may conversely be illuminated with IR light or light of another spectral range as well. The receiver-side separation of the light currents is carried out by appropriate detectors which are sensitive to the particular range of light. When physically equivalent detectors are used, areas 3, 26 are masked by optical filters which are each transparent only for the light in question. This state of affairs is shown schematically in FIGS. 4a–4d. FIGS. 4a and 4b show the spectra for illuminating areas 3 (energy supply) and 26 (data read-in). FIGS. 4c and 4d show the attenuation curves of the filters to be used for areas 3 and 26.

Separation of the light currents according to their frequency is advantageous as compared with separation of the light currents by optical systems in that the identification card can be illuminated over a large surface in the area of the circuit unit relative to the size of the circuit unit. Thus it is not necessary to adjust the cone of light.

In the above embodiments, data read-out was carried out by means of liquid crystal elements which can be applied advantageously due to their very low energy needs. These embodiments, however, require a hybrid construction of the circuit unit due to their combination of different technologies. When the elements necessary for data read-out are also integrated in the silicon wafer, a monolithic construction of the circuit unit is achieved. This can be obtained in principle by using light emitting diodes which can be directly integrated in the substrate for data read-out, although the high energy consumption of these elements may be unfavorable for specific ranges of application.

An advantageous embodiment is shown in FIG. 5. In the case of this circuit unit the data are read in and out capacitively. For this purpose vaporized conductive coatings 30,31 are located on the silicon wafer 1, which are connected with integrated circuit 2 by means of conductive ridges which are also vaporized (not shown in the figure). Photocells 3 are again provided for energy supply, which are integrated directly in the silicon wafer along with integrated circuit 2.

FIG. 6 shows the operation of an identification card provided with the last-mentioned circuit, in a control device. To read the data in or out, a counter electrode 33 is put on the identification card in the area of the circuit unit, which may be considerably larger than the circuit itself. Due to the use of only one counter electrode, which may also have a relatively large surface compared with the identification card, there are no problems with respect to the adjustment of the card within the control device. The electrode which is made of transparent material is provided with a transparent but conductive coating 34 so that the light from light sources 35 can reach the photocells of the circuit without any hindrances.

The control device communicates with the circuit unit of the identification card according to the so-called "multiplex" method. Data read-in and read-out are carried out serially within defined time spans.

After starting up the circuit, i.e. after a defined time span has elapsed after illumination of the photocells, the window for data read-in is first generated, and the corresponding receiving electrode (see FIG. 5, e.g. electrode 30) is made ready for operation. Electrode 33 of the control device acts as a transmitter in this phase. The integrated circuit generates a sequence of equidistant "scanning points" within the input window. If a voltage pulse generated by a data transmitting and receiving unit 36 and directed to the applied electrode 30 appears within two scanning points, the logic of the integrated circuit interprets it, for example, as logic 1; otherwise, i.e. if no pulse appears between two scanning points, as logic 0. The potentials of the data pulses fed to the conductive coating 30 are defined against the coating 31 vaporized on the underside of the silicon wafer and kept capacitively on reference potential by the grounded base plate 40 of the control device.

Read-out of the data takes place according to the principle depicted above for read-in, as soon as the window "data read-out" has been generated after a definite time span.

During this period the applied electrode 33, coupled with conductive coating 30, acts as a receiver. The periods for data read-in and read-out can be defined according to known methods by corresponding control information which the control device transmits to the circuit unit.

What is claimed is:

1. An apparatus comprising:
   (a) an identification card
   (b) a semiconductor substrate on said card
   (c) an integrated circuit integrated on said substrate and adapted to process electronic signals; and
   (d) a plurality of coupling elements coupled to said integrated integrated circuit, wherein said plurality of coupling elements comprises:
      (i) opto-electronic means for transferring energy to said integrated circuit;
      (ii) opto-electronic means means for transferring output data from said integrated circuit; and
      (iii) opto-electronic means for transferring input data to said integrated circuit, wherein all of said coupling elements are integrated and disposed on said semiconductor substrate which bears said integrated circuit.

2. An apparatus as defined in claim 1 wherein said means for transfering energy comprises photocells.

3. An apparatus as defined in claim 1 wherein said means for transfering input data are photodiodes.

4. An apparatus as defined in claim 1 wherein said means for transfering output data are liquid crystal elements.

5. An apparatus as defined in claim 1, wherein said means for transfering output data are light emitting diodes.

6. An apparatus as defined in claim 1 wherein said means for transfering input data and output data comprise conductive coatings vaporized on said substrate wherein said conductive coatings comprises means for capacitively transfering data.

7. An apparatus as defined in claim 1 wherein said input data transfering means and said energy transfering means comprise a joint opto-electronic element.

8. An apparatus as defined in claim 7 wherein said means for transferring energy to said integrated circuit comprises an energy supply for supplying energy to said integrated circuit in response to continuous light being applied to said energy supply, wherein said circuit unit further comprises means for receiving discontinuous light applied to said circuit unit, wherein said discontinuous light represents input data, wherein said integrated circuit further comprises means for processing said input data received by said means for receiving said discontinuous light, and means for feeding said input data from said receiving means to said processing means.

9. An apparatus as defined in claim 1, wherein said input data transfering means comprises an opto-electronic element, wherein said energy transfering means comprises an opto-electronic element separate from said opto-electronic element of said input data transfering means, wherein said separate opto-electronic elements are arranged on one side of said substrate.

10. An apparatus as defined in claim 9, wherein said input data transfering means comprises a plurality of opto-electronic elements, and wherein said energy transfering means comprises a plurality of opto-electronic elements, wherein said opto-electronic elements for data input respond to a certain frequency range of light applied to said opto-electronic elements for data input, wherein said opto-electronic elements for energy transfer respond to a frequency range of light applied to said opto-electronic elements for energy transfer different from the frequency range of applied light to which said opto-electronic elements for data input.

11. A method for transfering information and energy into a circuit unit, wherein said circuit unit comprises; a semiconductor substrate; an integrated circuit integrated on said substrate; and a plurality of coupling elements coupled to said integrated circuit, wherein said plurality of coupling elements comprises: means for transfering energy to said integrated circuit; means for transfering output data from said integrated circuit; and means for transfering input data to said integrated circuit, wherein all of said coupling elements are disposed on said semiconductor substrate which bears said integrated circuit, wherein said input data transfering means and said energy transfering means comprises separate opto-electronic elements of substantially identical physical constructions, wherein said separate opto-electronic elements are disposed on one side of said substrate, wherein said method comprises the step of:
   irradiating said separate opto-electronic elements separately by means of an optical imaging system.

12. A method for reading out output data from a circuit unit, wherein said circuit unit comprises: a semiconductor substrate; an integrated circuit integrated on said substrate; and a plurality of coupling elements coupled to said integrated circuit, wherein said plurality of coupling elements comprises: optoelectronic means for transfering energy to said integrated circuit; means for transfering output data from said integrated circuit; and means for transfering input data to said integrated circuit, wherein all of said coupling elements are disposed on said semiconductor substrate which bears said integrated circuit, wherein said data output transfering means comprises liquid crystal elements, wherein said method comprises the step of:

displaying said output data on said liquid crystal elements in the form of binary light/dark information.

13. The method for reading out output data as defined in claim 12, wherein said method further comprises the step of:

transfering said output data displayed on said liquid crystal elements to a photo-electric transducer of a test device by means of an optical system 14. A method for transfering input data and energy into a circuit unit, wherein said circuit unit comprises: a semiconductor substrate; an integrated circuit integrated on said substrate; and a plurality of coupling elements coupled to said integrated circuit, wherein said plurality of coupling elements comprises: means for transfering energy to said integrated circuit; means for transfering output data from said integrated circuit; and means for transfering input data to said integrated circuit, wherein all of said coupling elements are disposed on said semiconductor substrate which bears said integrated circuit, wherein said input data transfer means and said energy transfer means comprises a joint opto-electronic element, wherein said coupling elements on the same side of said substrate; wherein said method comprises the step of:

illuminating a substantially large area of said side of said circuit unit.

15. The method defined by claim 14 further comprising the step of:

illuminating said substantially large area with continuous and discontinuous light, wherein said discontinuous light represents input information.

16. A method for transfering input data and energy into a circuit unit, wherein said circuit unit comprises: a semiconductor substrate; an integrated circuit integrated on said substrate; and a plurality of coupling elements coupled to said integrated circuit, wherein said plurality of coupling elements comprises: means for transfering energy to said integrated circuit; means for transfering output data from said integrated circuit; and means for transfering input data to said integrated circuit, wherein all of said coupling elements are disposed on said semiconductor substrate which bears said integrated circuit, wherein said input data transfering means and said energy transfering means comprises separate opto-electronic elements arranged on one side of said substrate, wherein said opto-electronic elements for data input respond to applied light of a certain frequency range and wherein said opto-electronic elements for energy transfer respond to applied light of a certain frequency range different from said frequency range for said applied light for said opto-electronic elements for data input, wherein said method comprises the step of:

separating said applied light into different frequencies and illuminating said opto-electronic elements with said applied light separated into different frequencies.

17. A method for transfering input data into and output data out of a circuit unit, wherein said circuit unit comprises: a semiconductor substrate; an integrated circuit integrated on said substrate; and a plurality of coupling elements coupled to said integrated circuit, wherein said plurality of coupling elements comprises: means for transfering energy to said integrated circuit; means for transfering output data from said integrated circuit; and means for transfering input data to said integrated circuit, wherein all of said coupling are disposed on said semiconductor substrate which bears said integrated circuit, wherein said input data and output data transfering means comprise conductive coatings vaporized on said substrate, wherein said conductive coatings comprise means for capacitively transfering input and output data, wherein said method comprises the step of:

serially transfering said input data to said conductive coatings and transfering said output data from said conductive coatings within defined time spans.

18. The method as defined in claim 17, wherein said method further comprises the step of:

transfering said input data to said conductive coatings by means of an electrode having a larger surface area than said circuit unit and transfering said output data from said conductive coatings to said electrode.

19. The method defined by claim 11 wherein said separate opto-electronic elements respond to applied light having different frequency ranges, wherein said method further comprises the step of separately irradiating said separate opto-electronic elements with light having different frequency ranges.

20. The method defined by claim 14, wherein said energy transfer means comprises an energy supply for supplying energy to said integrated circuit in response to the application of continuous light, wherein said integrated circuit further comprises means for processing input data, wherein said input data transferring means transfers input data to said processing means in response to the application of discontinuous light, wherein said discontinuous light represents said input information, wherein said method further comprises the step of:

illuminating said opto-electronic element with continuous light and with discontinuous light, and directing said continuous light to said energy supply and directing said discontinuous light to said input data transfer means.

21. The method defined by claim 14, wherein said method further comprises the step of transfering said input data and said energy to said integrated circuit by separate opto-electronic elements arranged on one side of said substrate.

22. The method defined by claim 21 wherein said separate opto-electronic elements for data input and energy transfer respond to applied light having different frequency ranges, wherein said method further comprises the step of illuminating said opto-electronic elements for data input and energy transfer with light having different frequency ranges.

23. The method defined by claim 15 wherein said energy transfer means comprises an energy supply for supplying energy to said integrated circuit in response to the application of continuous light, wherein said integrated circuit further comprises means for processing input data, wherein said input data transferring means transfers input data to said processing means in response to the application of discontinuous light, wherein said discontinuous light represents said input information, wherein said method further comprises the step of:

illuminating said opto-electronic element with continuous light and with discontinuous light, and directing said continuous light to said energy supply and directing said discontinuous light to said input data transfer means.

24. The method defined by claim 16 further comprising the step of: illuminating said opto-electronic elements for data input with applied light of only one frequency and illuminating said opto-electronic elements for energry transfer only with applied light of a different frequency than said light applied to said opto-electronic elements for data input.

25. An apparatus defined by claim 9 wherein said separate opto-electronic elements are of substantially indentical physical construction, wherein said circuit unit further comprises an optical imaging system for illuminating said separate opto-electronic elements separately.

26. An apparatus defined by claim 4 wherein said liquid crystal elements comprise means for displaying output data in the form of binary light/dark information.

27. An apparatus defined by claim 26 in combination with a test device and an optical system, wherein said test device comprises means for evaluating said binary light/dark information, wherein said test device comprises a photo-electric transducer, and wherein said optical system comprises means for transmitting said binary light/dark information from said liquid crystal elements to said photo-electric transducer.

28. An apparatus defined by claim 7, in combination with means for illuminating said opto-electronic elements, wherein said coupling elements are disposed on the same side of said substrate, wherein illuminating means comprises means for illuminating said coupling elements over a large surface.

29. The apparatus defined by claim 7 in combination with means for illuminating said opto-electronic elements with continuous and discontinuous light over a substantial part of said identification card.

30. An apparatus defined by claim 10 in combination with means for illuminating said opto-electronic elements with said light having different frequency ranges, wherein said illuminating means separates light of said different frequency ranges.

31. An apparatus defined by claim 6 in combination with means for transmitting input data to said input data transfering means, wherein said transmitting means and said output data transfering means comprise means for serially transmitting input data to said input data transfering means, and said means for transfering output data comprises means for transfering said output data serially from said integrated circuit.

32. An apparatus defined by claim 31 wherein said transmitting means comprises an electrode having a larger surface area than said circuit unit, wherein said electrode comprises means for receiving output data from said output data transfering 33. The apparatus as defined by claim 1 wherein said integrated circuit and said plurality of coupling elements are monolithically integrated on said semiconductor substrate.

* * * * *